May 20, 1952

H. P. KEIL

2,597,804

DRIVE AND CONTROL MEANS FOR SHEET FEEDING
ROLLERS IN DUPLICATING APPARATUS

Filed July 12, 1947

INVENTOR.
Henry P. Keil
BY Greek Wells
Attorney

INVENTOR.
Henry P. Keil
BY Streek Wells
Attorney

INVENTOR.
Henry P. Keil
BY Greek Wells
Attorney

May 20, 1952 — H. P. KEIL — 2,597,804
DRIVE AND CONTROL MEANS FOR SHEET FEEDING
ROLLERS IN DUPLICATING APPARATUS
Filed July 12, 1947 — 10 Sheets-Sheet 8

INVENTOR.
Henry P. Keil
BY
Attorney

Patented May 20, 1952

2,597,804

UNITED STATES PATENT OFFICE 2,597,804

DRIVE AND CONTROL MEANS FOR SHEET FEEDING ROLLERS IN DUPLICATING APPARATUS

Henry P. Keil, Chicago, Ill., assignor to The Fixture Hardware Corporation, Chicago, Ill., a corporation of Illinois Application July 12, 1947, Serial No. 760,538

8 Claims. (Cl. 101—132.5)

My invention relates to duplicating apparatus of the so called "wet process" type wherein a mirror script master sheet is applied to a copy sheet that is moistened with a solvent for the ink on the master sheet.

In apparatus of this character it is customary to use a drum for mounting the master sheet. A pair of rollers are positioned adjacent to the drum. The copy sheets are fed to these rollers which forward them to the drum. The copy sheets are pressed against the master sheet by a platen roller, so that, as the drum rotates, the copy sheet will have one face thereof engaged with the master sheet. One of the pair of rollers is moistened to supply a film of liquid to the copy as it is advanced by the rollers.

In machines of the character described the rollers mentioned above are of a yielding or resilient nature so that they are deformed somewhat when engaged with the copy sheet. It is necessary to have considerable pressure on a sheet between the pair of rollers and on the sheets between the platen roller and the drum to obtain good copies. The rollers are usually made of a synthetic rubber or natural rubber composition. The pressure used has a tendency to deform the rollers, so if they are left under pressure when idle they take a permanent set and are no longer round. Furthermore the pressure and the fluid used will often cause the pair of rollers to stick to each other so tightly when they are left idle for some time, that one or both of the rollers will be ruined.

It is the purpose of my invention to provide a novel duplicating apparatus whereby the rollers are protected from the damages outlined above by being released from the pressure and separated except when they are actually being used.

It is a further purpose of my invention to provide a novel driving arrangement between the drum and the aforesaid rollers whereby the rotation of the drum effects the rotation of the rollers in proper timed relation.

Another and more specific object of my invention is to provide a duplicating apparatus of the character described with a novel combination of the master sheet gripping device on the drum and the rollers whereby release of the master sheet by the gripping device also releases the pressure between the rollers.

It is also a purpose of my invention to provide an improved driving means for the feeding and moistening rollers of a duplicating apparatus of the character described.

My invention also contemplates an improved feed tray for the duplicating apparatus for positioning and holding copy sheets of various widths and lengths.

The nature and advantages of my invention will be more clearly understood from the following detailed description and the accompanying drawings wherein a preferred form of the invention is shown. It should be understood, however, that the drawings and description are illustrative only and are not to be taken as limiting the invention except insofar as it is limited by the claims.

Figure 14:
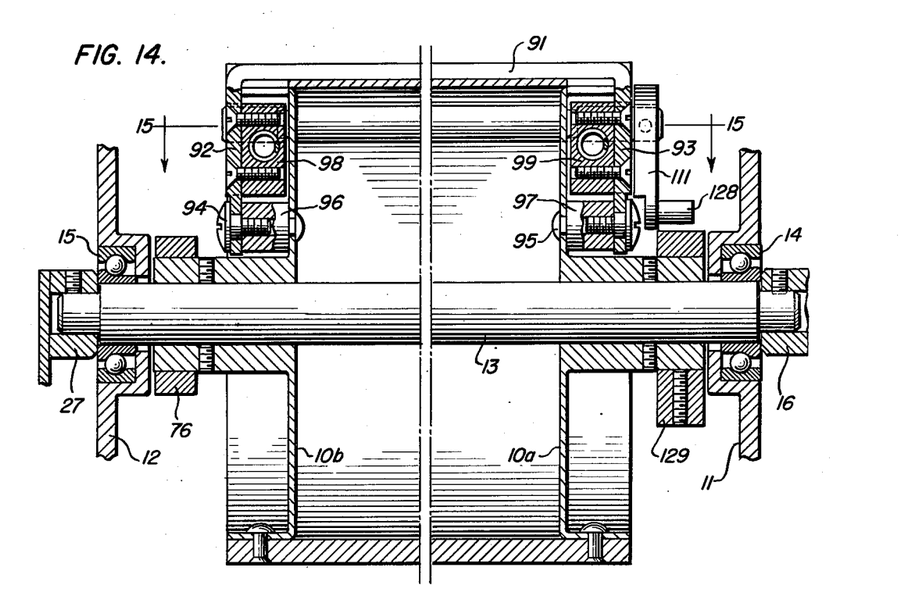
Figure 14 is a sectional view taken on the line 14—14 of Figure 11.
Figure 15:
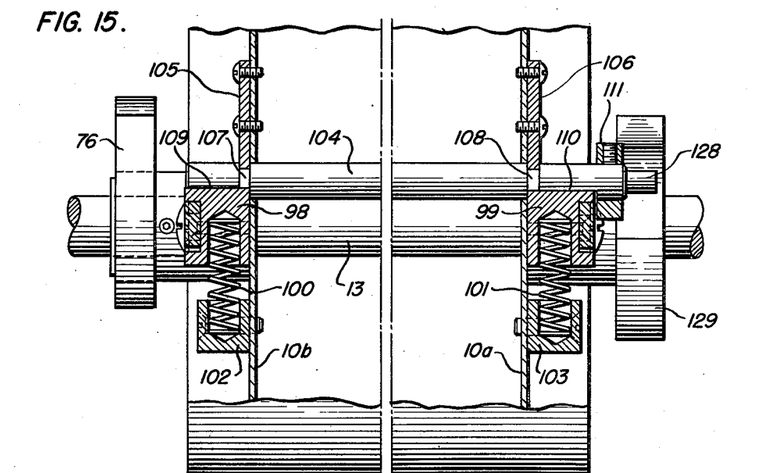
Figure 15 is a sectional view taken on the line 15—15 of Figure 14.

Referring now to the drawings, my invention is embodied in a duplicating apparatus wherein a drum 10 is mounted for rotation between two side frames 11 and 12. The drum is fixed on a shaft 13 (see Figure 14) which is journalled in bearings 14 and 15 in the side frames 11 and 12. A hand lever 16 is secured on one end of the shaft 13 for rotating the drum.

The apparatus includes a sheet feed tray 17, a sheet receiving tray 18, and a sheet advancing member 19. The sheet advancing member 19 is carried by an arm 20 that is pivoted on a bar 21. The bar 21 is slidable endwise in the horizontally extending portion 23 of a lever 22 and is held in adjusted position by a set screw 24. The lever 22 is pivoted on the side frame 12 at 25. It is operated by a link 26 that is connected to a crank arm 27 which is fixed to the end of the shaft 13.

Figures 1, 3:
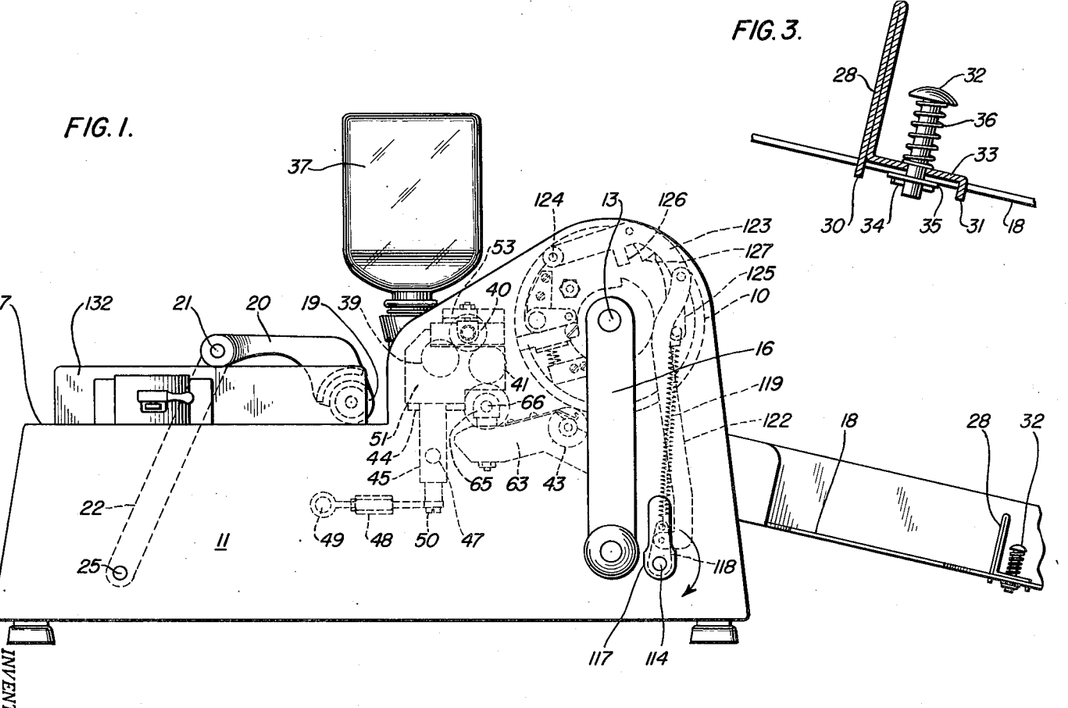
Figure 1 is a view in side elevation of a duplicating machine embodying my invention.
Figure 3 is an enlarged fragmentary sectional view taken on the line 3—3 of Figure 2.
Figure 2:
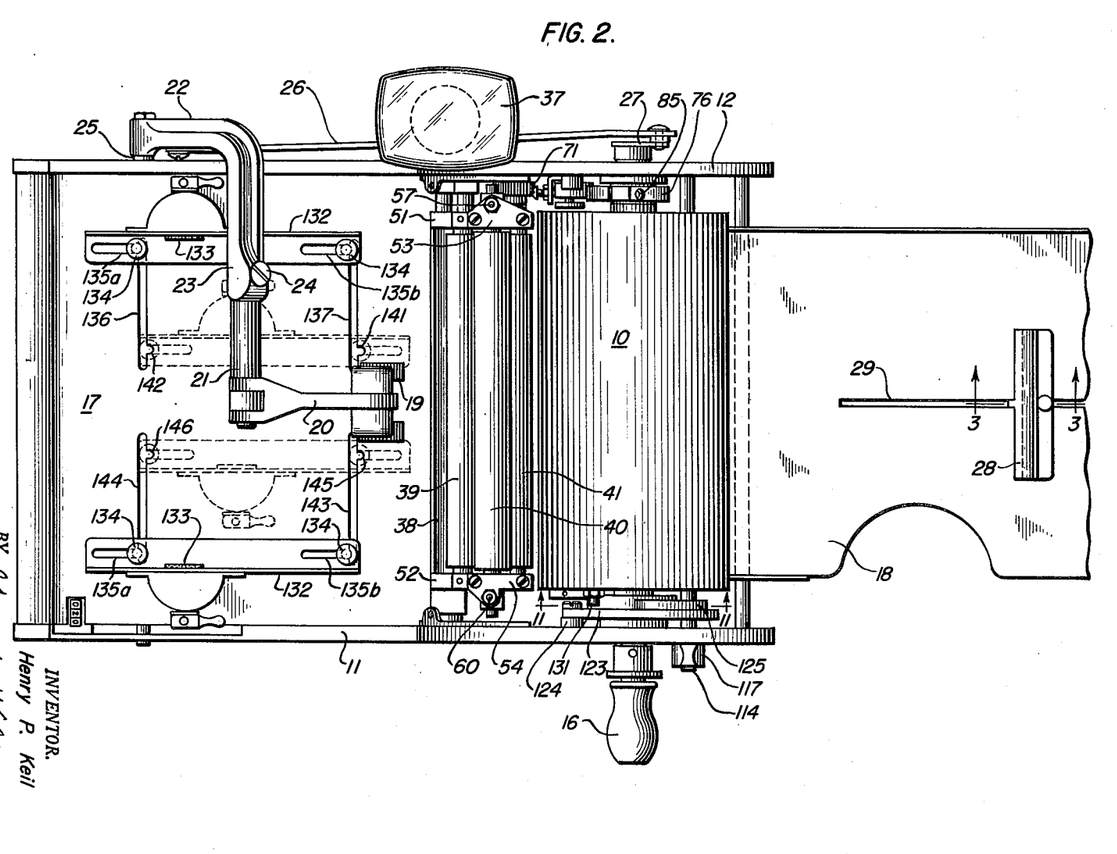
Figure 2 is a plan view of the machine.

The receiving tray 18 has an adjustable stop 28 mounted thereon. The tray 18 has a slot 29 extending lengthwise thereof. The stop 28 comprises a metal strip folded to the shape shown in Figure 3 of the drawings. Two guide lugs 30 and 31 are formed on the strip to engage in the slot 29. A headed pin 32 extends through the portion 33 of the strip 28 and has a key 34 therein holding a washer 35 against the under side of the tray 18. A spring 36 is coiled around the pin 32.

The means for moistening copy sheets and advancing them to the drum comprises a container 37 supplying liquid to a trough 38. A roller 39 runs in the trough 38 and transfers liquid to a second roller 40 located above and at one side thereof. The roller 40 transfers liquid to a sheet feeding and moistening roller 41 which is rotated, as will be later described, in proper timed relation to the drum 10. A counter roller 42 (see Figures 5, 9, and 10) cooperates with the roller 41 to advance the sheets. A platen roller 43 rides against the drum 10 to press the moistened copy sheets advanced by the rollers 41 and 42 against a master sheet on the drum 10.

The mounting details of the rollers 39, 40, and 41 are shown best by Figures 5, 6, 8, and 9. These rollers and the trough 38 are carried as a unit by a sub-frame 44 which has depending arms 45 and 46 which are pivoted on a cross rod 47 that is mounted on the side frames 11 and 12. Two turnbuckles 47 are connected to the side frames 11 and 12, and are secured to the lower ends of the arms 45 and 46 respectively for holding the frame in a position to maintain the desired pressure between the rollers 41 and 42. The turnbuckle is mouned at one end of a stud 49 that is provided on the side frame 11 or 12. A screw 50 secures the other end of the turnbuckle to the arm 45 or 46.

Figure 8:
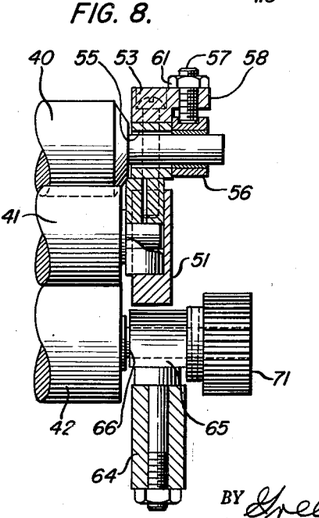
Figure 8 is a fragmentary sectional view taken on the line 8—8 of Figure 9.

The sub-frame 44 has end plates 51 and 52 that provide bearing supports for the rollers 39 and 41. The roller 40 is carried by bearing blocks 53 and 54 that are mounted on the plates 51 and 52. As shown by Figure 8, the block 53 has an opening 55 somewhat larger than the shaft of the roller 40. The shaft extends through the opening 55 and is journalled in a bearing 56 that is suspended by a threaded bolt 57 from a flange 58 on the block 53. The bearing block 54 mounts the other end of the roller 40 in a like manner by a bearing 59 and a bolt 60. Nuts 61 and 62 on the bolts 57 and 60 are used to lock the bearings 56 and 59 at the proper heights to provide uniform pressure of the roller 40, on the rollers 39 and 41.

The rollers 42 and 43 are carried by two arms 63 and 64. Bearing blocks 65 are bolted on the upper ends of the arms 63 and 64 for supporting the shaft 66 of the roller 42. The arms 63 and 64 are pivoted on the side frames 11 and 12 by stub shafts 67. The platen roller 43 is removably held on the arms 63 and 64 by having small bearings 69 on its shaft 68 seated in recesses formed in the top surfaces of the arms. Springs 70 are mounted on the arms and overlie the bearings. When it is desired, the roller 43 can be removed by lifting it against the pressure of the springs 70.

Figure 13:
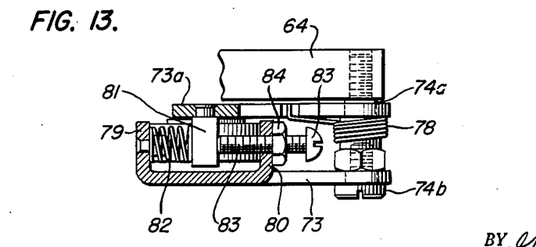
Figure 13 is a fragmentary sectional view taken on the line 13—13 of Figure 9.

The shaft 66 extends beyond the bearing block 65 on the arm 64 and has a roughened driving wheel 71 thereon. The shaft 68 of the roller 43 is also extended beyond its bearing 69 on the arm 64, and carries a roughened driving wheel 72 thereon. See Figures 9 and 10. The wheels 71 and 72 are utilized to drive the moistening roller assembly in a manner that will now be described. The arm 64 has an L-shaped lever 73 pivoted thereon at 74. The lever 73 carries a roller 75 of yielding material such as a relatively hard synthetic rubber. The roller 75 is located in the plane of the wheels 71 and 72 but its axis is below their axes, and it is movable up and down, into and out of engagement with the wheels 71 and 72 by a cam member 76 on the drum which engages a roller 77. The lever 73, as shown by Figure 13, includes an inner arm 73a which is pivoted on the stub shaft 74a, and is urged in a counter clockwise direction by a spring 78. Another stub shaft 74b is secured in the head of the shaft 74a and pivotally mounts an outer arm 73b which extends upwardly beyond the upper end of the arm 73a and carries the roller 77. The roller 75 is mounted on the arm 73a. The arms 73a and 73b are so connected as to provide a certain amount of yield between them and to provide for adjustment of their relative positions to control the pressure of the roller 75 against the wheels 71 and 72. This connection comprises two ears 79 and 80 formed on an enlarged portion of the arm 73b, a bar 81 fixed on the arm 73a, a spring 82 between the bar 81 and the ear 79, and an adjusting screw 83 threaded in the ear 80. A lock nut 84 locks the screw 83 in adjusted position.

Figure 9:
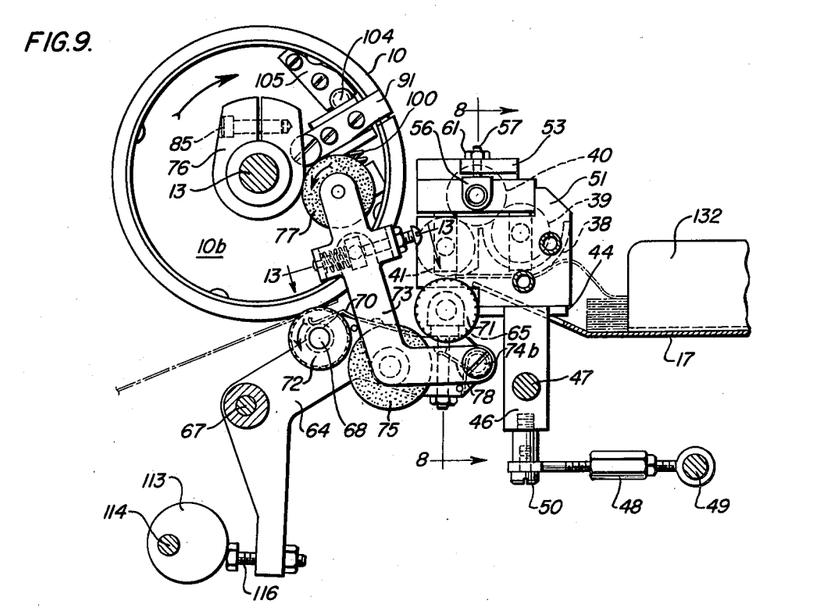
Figure 9 is a sectional view taken on the line 9—9 of Figure 4.
Figure 10:
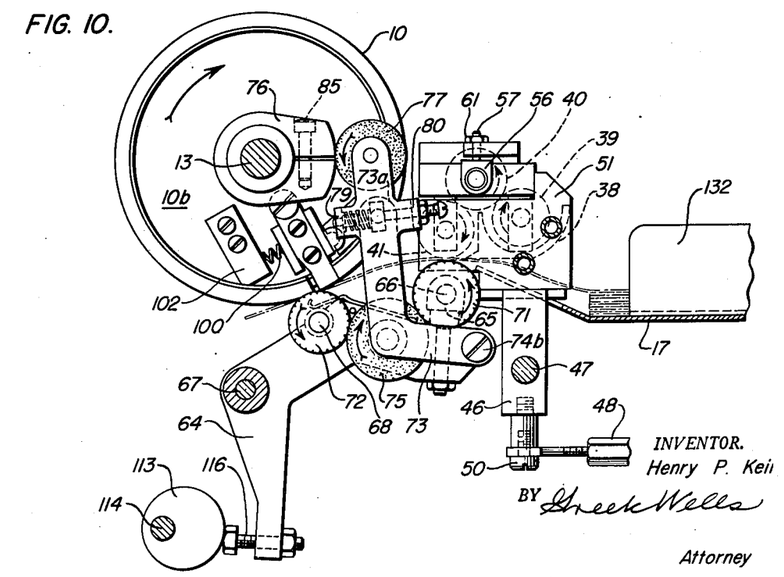
Figure 10 is a view similar to Figure 9 but showing the parts in changed position.

Figure 9 of the drawings shows the positions of the parts when the roller 75 is spaced from both wheels 71 and 72. The wheel 72 of course turns as long as the drum 10 is turning and the platen roller 43 is pressed toward it. As soon as the cam 76 moves the roller 77 out far enough to lift the arm 73 and the roller 75 far enough to engage the roller 75 with the wheels 71 and 72, the rotation of the wheel 72 will be transmitted to the wheel 71 to start the roller 42. The roller 42 drives the roller 41, and, since the rollers 40 and 39 are in engagement with the roller 41, all of the moistening rollers will be operated. The cam 76 is clamped on the shaft 13 of the drum by a screw 85. The timed relation of the moistening and feeding rollers 41 and 42 with respect to the drum can thus be varied by shifting the cam 76 angularly about the shaft 13.

This novel drive mechanism, whereby the platen roller 43 serves to transmit the driving force for the moistener from the drum is very simple, and free of mechanical trouble. It eliminates unnecessary gears and driving parts. Wearing of the parts is easily compensated for to maintain an accurate margin on the copy sheets.

According to my invention the rollers 42 and 43 are adapted to be always lowered away from the roller 41 and the drum when the machine is left idle. I utilize an interlocking means between the master sheet gripping means and the roller lowering mechanism to accomplish this result. The master sheet gripping means comprises a slot 90 in the surface of the drum 10. A gripping bar 91 is mounted in the slot 90 and has end portions 92 and 93, (see Figures 11, 12, 14 and 15) extending radially inward. These end portions are pivoted to the ends 10a and 10b of the drum by pivot members 94 and 95, that are secured in posts 96 and 97 secured to the drum ends 10a and 10b. The end portions carry blocks 98 and 99 which are bored to receive two springs 100 and 101. The opposite ends of the springs 100 and 101 are seated in stop blocks 102 and 103 that are secured to the end portions 10a and 10b of the drum. The springs 100 and 101 are under compression and tend to press the gripping member 91 against a master sheet in the slot 90.

Figure 11:
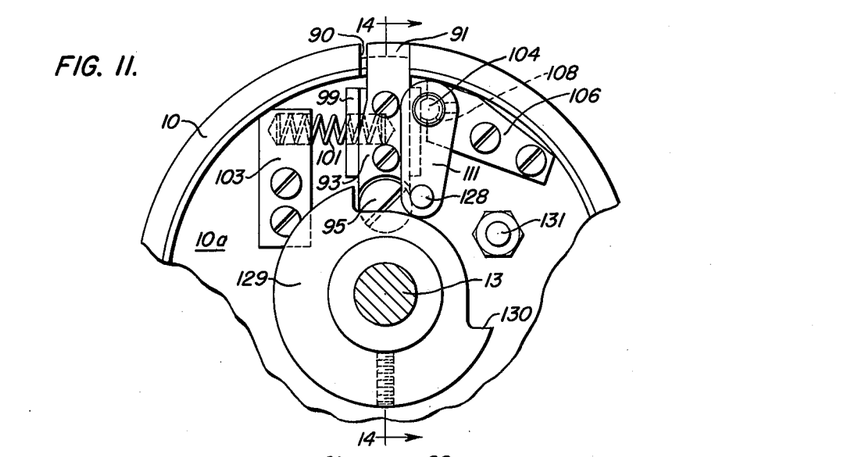
Figures 11 and 12 are enlarged fragmentary sectional views taken on the line 11—11 of Figure 2.
Figure 12:
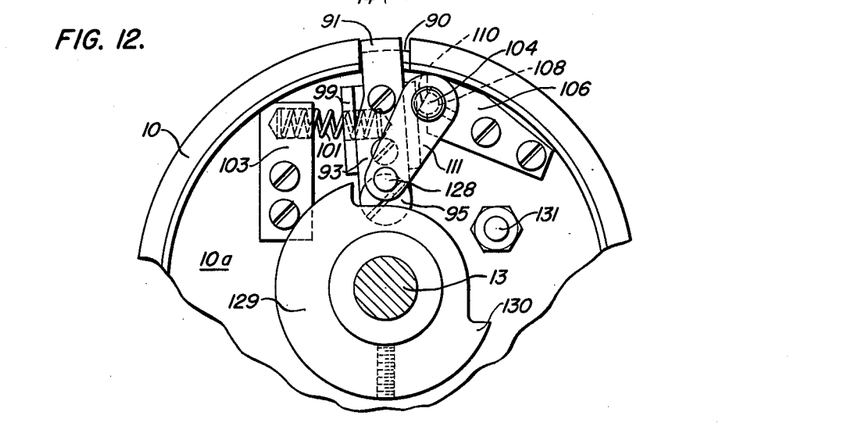

The gripping member 91 is moved against the force of the springs to release a master sheet by a shaft 104. This shaft is pivotally mounted in the end portions 10a and 10b, and is prevented from shifting endwise by two plates 105 and 106 fastened to the end portions, and extending into annular grooves 107 and 108 provided in the shaft 104. The shaft 104 is flattened at 109 and 110 where it engages the blocks 98 and 99. An arm 111 is fastened to the shaft 104 for rocking it to cause the flattened portions 109 and 110 to force the gripping member open. Figure 11 shows the positions of the parts when the gripping member is closed. Figure 12 shows the positions of the parts when the gripping member is opened.

In order to control the opening and closing of the gripping member in connection with the release of the rollers 42 and 43 from pressure, I mount a pair of eccentrics 112 and 113, (Figures 4, 5, and 7) on a shaft 114 that is rotatably mounted in the side frames 11 and 12. The eccentrics engage adjustable stops 115 and 116 that are secured in the lower ends of the arms 63 and 64. The shaft 114 extends through the side frame 11 and has a hand lever 117 thereon. Just inside the side frame 11 I mount a link 118 to which a spring 119 is secured. Adjacent to the link 118 I also secure an attaching arm 120 on the shaft 114 by means of a set screw 121. The arm 120 has the lower end of a link 122 secured therein. The upper end of the link 122 is pivoted to a lever 123. The lever 123 is pivoted on a stud 124 on the side frame 11. The spring 119 is connected to a link 125 that is also pivoted to the lever 123. The lever 123 has a depending lug 126 and the link 125 has a shoulder 127. The arm 111 has a pin 128 thereon. A stop cam 129 is secured on the shaft 13. The parts just described cooperate to control the gripping member and the rollers 42 and 43 in a manner which will now be described.

Figure 5:
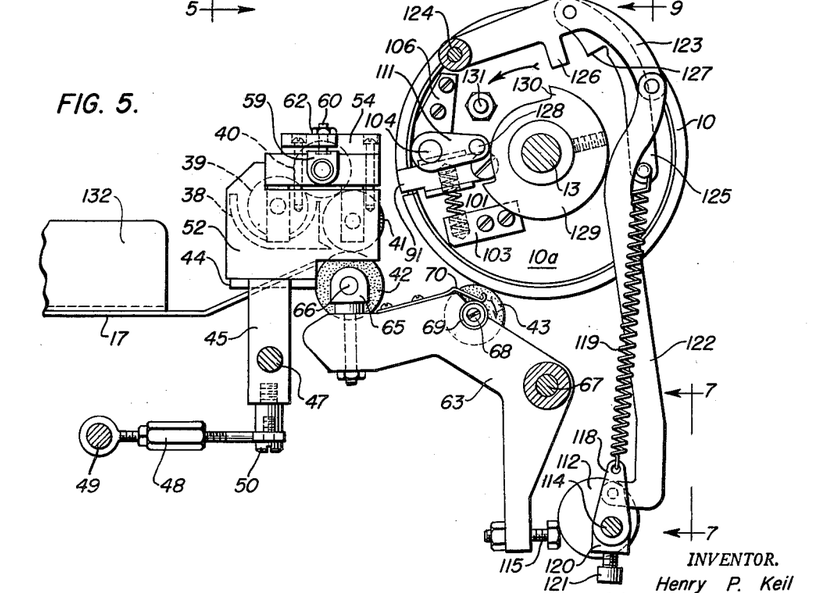
Figure 5 is a sectional view on the line 5—5 of Figure 4.
Figure 6:
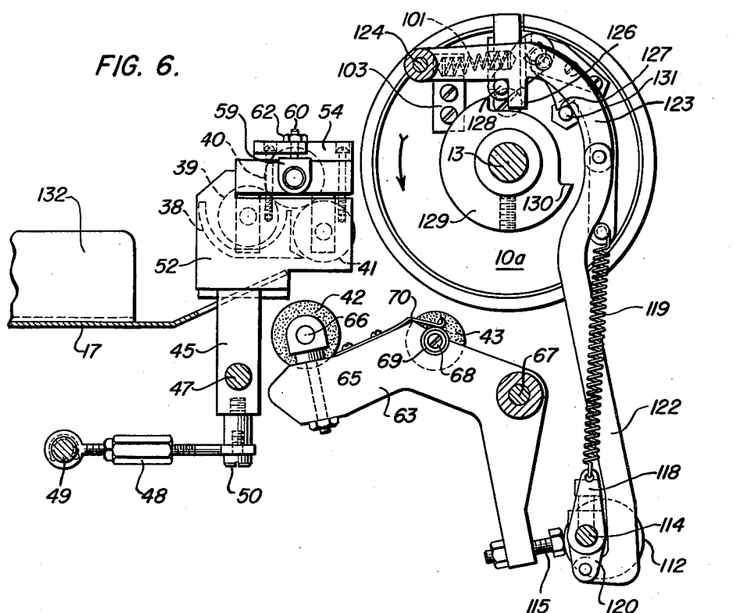
Figure 6 is a sectional view on the line 5—5 of Figure 4 showing the parts in another position.

When the parts are in the position shown in Figure 5 the rollers 42 and 43 are under pressure and the gripping member is closed. Rotation of the drum will cause the moistening rollers to moisten and advance a copy sheet to the drum and the platen roller will press the copy sheet against a master sheet on the drum. When the operator finishes a run of copies the master sheet is removed from the drum and usually saved for future use. In order to release the master sheet from the drum, the hand lever 117 is turned clockwise to bring the parts carried by and connected to the shaft 114 to the position shown in Figure 6.

This allows the rollers 42 and 43 to drop away from the roller 41 and the drum. The lug 126 is moved down into the path of the pin 128, provided the drum is turned backward slightly, to allow the lug to clear a shoulder 130 on the cam 129. Then the drum is turned backward further until the lug 126 turns the arm 111 to open the master sheet gripping member. At this point the shoulder 127 engages over a pin 131 on the end portion 10a of the drum, and prevents forward rotation of the drum until the hand lever is returned to its original position. The drum is thus locked against turning in either direction and the gripper is held open.

Figure 16:
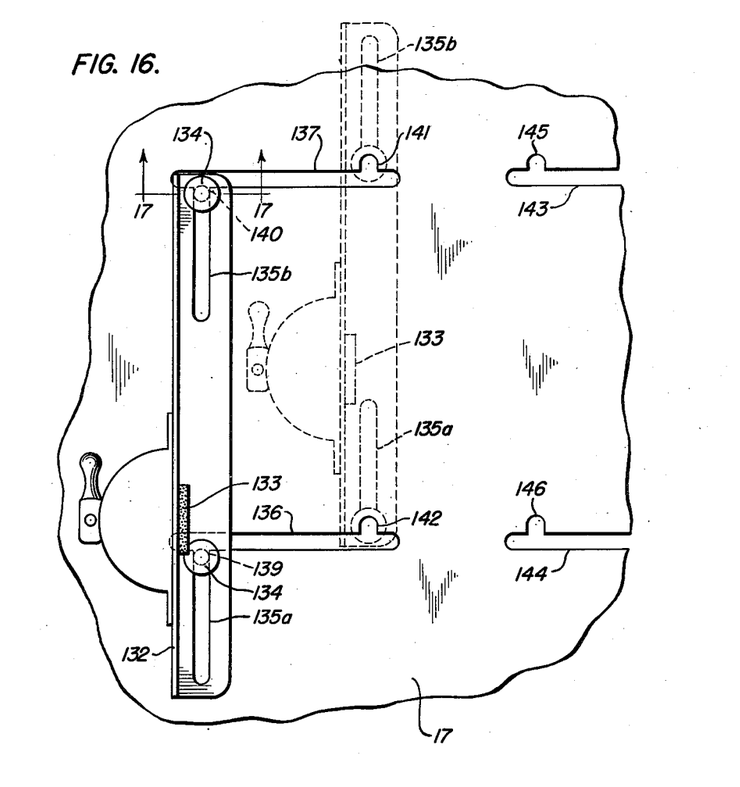
Figure 16 is a fragmentary plan view of the feed tray employed.
Figure 17:
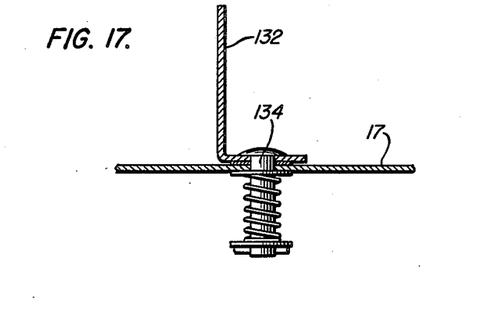
Figure 17 is a sectional view taken on the line 17—17 of Figure 16.

Referring now to Figures 16 and 17, these figures illustrate more in detail the features of the sheet feed tray 17, which I consider to be new and which make sheet feeding better. The tray 17 is provided with adjustable side guides 132 which carry retractable soft gripping members 133 for engaging the side edges of copy sheets on the tray 17. The side guides are held in position by spring pressed pins 134. There are two pins 134 for each side guide. Each side guide has a long slot 135a at its front end and a similar long slot 135b near the rear end. Thus the guide can be moved endwise on the tray to position the gripping member 133 for longer and shorter sheets. It is always best to grip the sheets near the back end thereof. They feed more easily and evenly when engaged by the feeding device.

The tray 17 has transverse slots 136, 137, 143, and 144, for the pins 134. Near the outer ends the slots 136 and 137 have lateral extensions 139 and 140. Like extensions (not shown) are provided for the slots 143 and 144. The inner ends of the slots 136, 137, 143, and 144 have the lateral extensions 141, 142, 145 and 146.

When the side guides are shifted for narrower paper, or larger paper, the extensions provide convenient means to position them. When the paper is long, the guides are moved back to enable the gripping members 133 to engage the sheets near the rear ends thereof.

In Figures 18 to 22 inclusive, I have shown a modified construction whereby the rollers 42 and 43 are moved away from the moistening roller 41 and the drum. In this form of the invention the drum, the moistening mechanism, and the operating mechanism for the master sheet gripper are the same as in the main form of the invention. This is also true of the construction of the supporting arms for the rollers 42 and 43.

In this form of the invention I provide a lever 150 which is fastened by pivot pins 151 to the side frame 11. The lever 150 has a shoulder 152 for engaging the pin 128 on the arm 111 to operate the master sheet gripping bar as before. I also provide a cam roller 153 on the lever 150 in a position to engage a cam 154 that is secured on the drum shaft 13. As illustrated best in Figures 19 and 21, the roller 153 is adapted to ride upon a flattened portion 155 of the cam 154 when the gripping bar is open.

A link 156 is secured to the free end of the lever 150 and extends downwardly to a pivotal connection 157 on an arm 158 that has a roller 159 which is adapted to engage the stop member 115 on the arm 63. A similar arm 158 and roller 159 are provided on the shaft 160 that is supported by the side frames 11 and 12. A link 161 is connected to the arm 150 by a pivot pin 162 and is connected to the link 156 by a spring 163.

Figures 18, 19, 20:
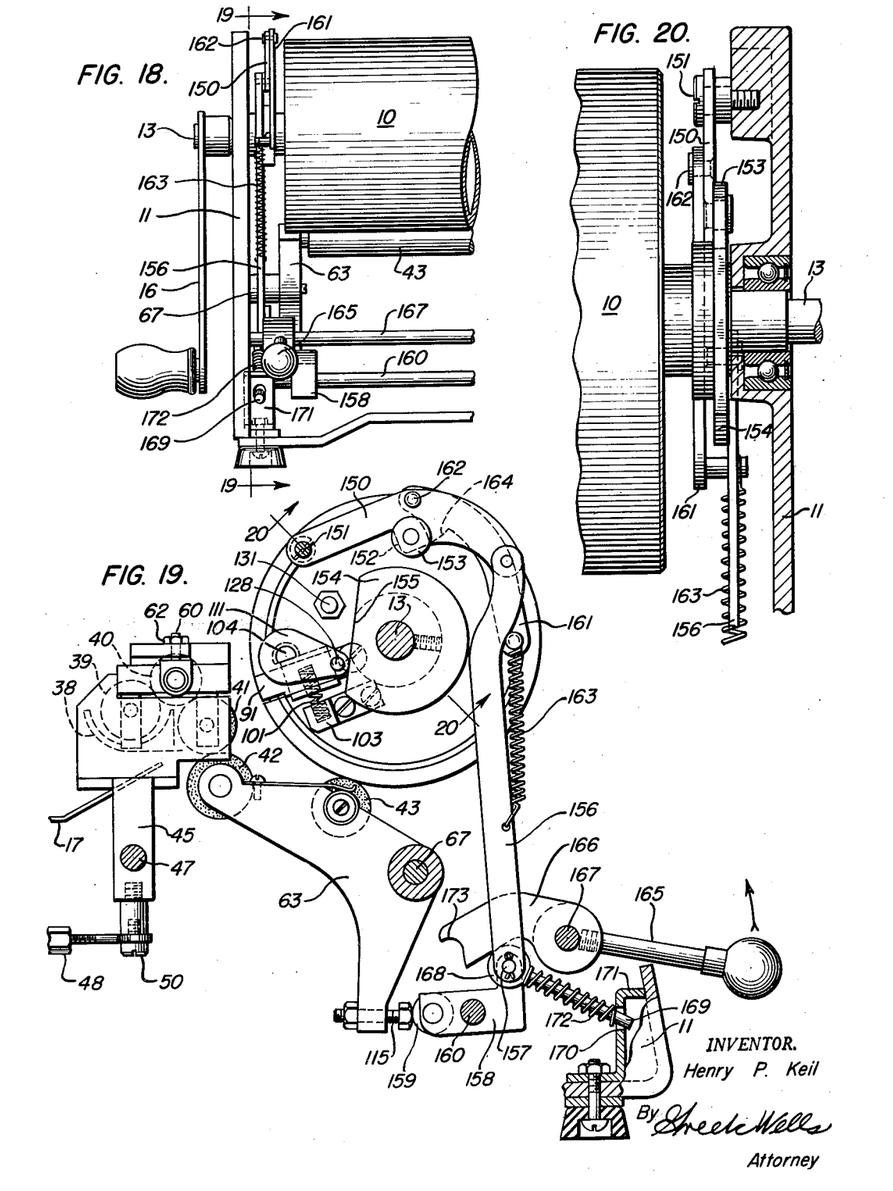
Figure 18 is a fragmentary rear end view of a modified form of the invention.
Figure 19 is a sectional view taken on the line 19—19 of Figure 18.
Figure 20 is an enlarged sectional view taken on the line 20—20 of Figure 19.
Figures 21, 22:
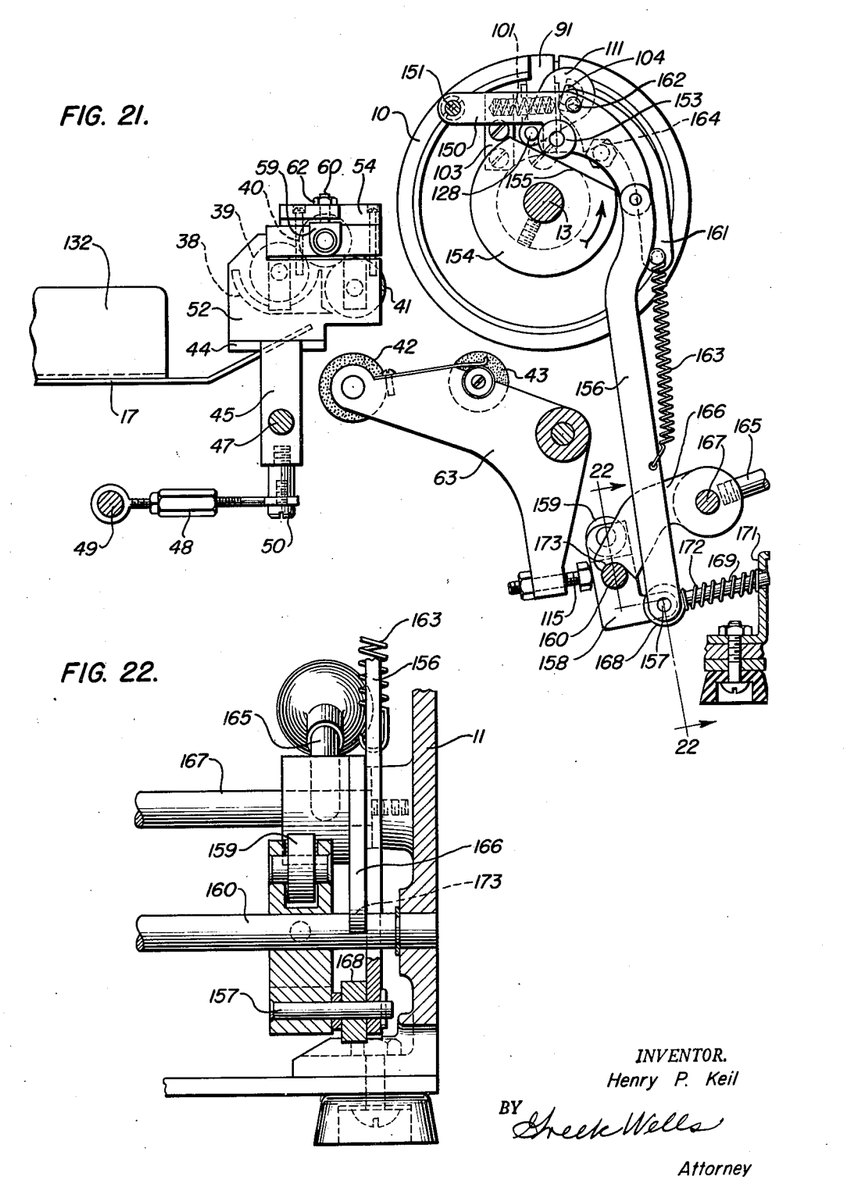
Figure 21 is a view like Figure 19 but showing the parts in changed position.
Figure 22 is an enlarged sectional view on the line 22—22 of Figure 21.

In order to open the gripping member and to move the rollers 42 and 43 from the position shown in Figure 19 to that shown in Figure 21, I provide a hand lever 165 and an operating member 166 to which the hand lever is secured. The operating member 166 is journalled on a cross rod 167 that connects the side frames 11 and 12. The operating member 166 is positioned to engage a head 168 that is pivoted on the pin 157 so that by lifting up on the hand lever 165 the head 168 will be forced down to pull the link 156 and the lever arm 150 downwardly. The head 168 has a bar 169 rigid therewith. This bar extends into an opening 170 provided on a small bracket 171 that is mounted in the lower corner of the side frame 11, as shown best in Figures 19 and 21. A spring 172 is under compression between the head 168 and the bracket 171 on the bar 169. These parts form a snap-over mechanism which is adapted, when the head 168 is pushed downwardly beyond the line between the opening 170 and the shaft 160, to cause the member 158 to continue to turn in a clockwise direction, and the link 156 to continue to move down until the parts reach the position shown in Figure 21.

The operating member 166 has a notch 173 in its free end which is adapted to engage on the shaft 160 as a limiting position for the movement of the operating member. In the lower position shown in Figure 21, the stop members 115 engage against the flat faces on the arms 158, and the rollers 42 and 43 are thus left separated from the roller 41 and the drum 10 when the master sheet gripping member is open. In this position of the parts, the roller 153 is riding upon the flattened portion 155 of the cam 154. In order to restore the parts to operating position, and to close the gripping member, it is only necessary to rotate the shaft 13 and the drum 10 in the direction of the arrow shown in Figure 21. The cam 154 will then force the lever arm 150 upwardly against the pull of the spring 172 on the link 156 until the bar 169 passes the line between the shaft 160 and the opening 170. When this occurs the spring 172 will continue to urge the link 156 upwardly and will continue to turn the arm 158 about the shaft 160 to bring the roller 159 against the stop 115.

The gripping member 91 is caused to close by the springs 100 and 101 to hold a master sheet in place. Also the operating member 166 is returned by the head 168 to the position shown in Figure 19. Thus the parts are all restored to operating position, after the machine has been left idle, by merely rotating the drum in the usual fashion. The parts will remain in this operating position with the rollers 42 and 43 pressing against the roller 41 and the drum 10, until it is desired to release a master sheet again from the gripping member 91. Whenever the master sheet is to be removed, when a particular run of copies has been finished, the operator merely lifts the hand lever 165 to again cause the operating member 166 to move the head 168 downwardly. It is necessary, of course, to have stopped the drum at this time, with the gripping member 91 near the top of the drum so that the flattened portion 155 of the cam 154 will be beneath the roller 153 on the arm 150. If this is not done, the operating member 166 cannot move the head 168 far enough down to pass dead center.

Figure 4:
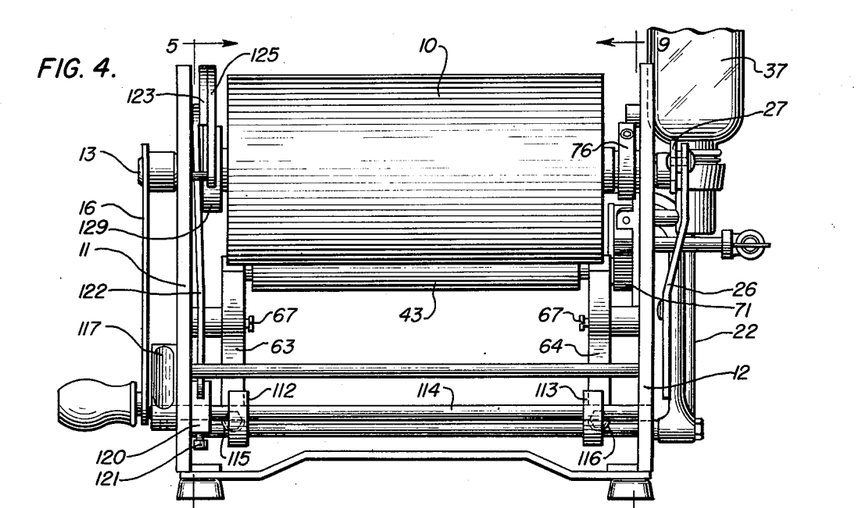
Figure 4 is a rear end view of the machine with the sheet receiving tray removed.
Figure 7:
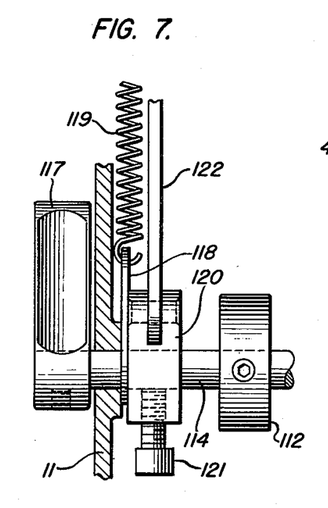
Figure 7 is an enlarged fragmentary sectional view taken on the line 7—7 of Figure 5.

The mechanism shown in Figures 18 to 22 inclusive may be substituted in the machine for the gripper opening and interlock mechanism previously described in connection with Figures 4, 5, and 7. In both forms of the invention the platen roller and the lower roller of the moistening and feeding pair of rollers are positively lowered whenever the master sheet gripping member is opened. This prevents the machine from being left with the rollers under pressure so as to cause them to become stuck or flattened and thus ruined for further use.

It is believed that the nature and advantages of my invention will be clear from the foregoing description. Having thus described my invention, I claim:

1. In a duplicating apparatus of the character described, the combination with a rotatable drum, of a platen roller in pressure engagement therewith, combined feeding and moistening rollers adjacent to said drum for advancing sheets to the drum for passage between the drum and platen roller, and drive means for the feeding and moistening rollers comprising a drive wheel fixed on the platen roller, a driven wheel fixed on one of the moistening rollers and means operably connecting the drive wheel to the driven wheel during a portion of each rotation of the drum whereby rotation of the platen roller effects temporary rotation of the feeding and moistening rollers, said connecting means comprising a cam on the drum and a motion transmitting member movable by said cam into position to transmit the rotation of said drive wheel to the driven wheel.

2. In a duplicating apparatus the combination with a drum of a gripping member for securing a master sheet thereto, a platen roller cooperating with the drum, a pair of copy sheet advancing rollers and means interconnecting the gripping member and one of said advancing rollers, operable, upon opening the gripping member, to separate the advancing rollers, said means comprising a lever arm on the drum operable to open the gripping member, a pin thereon, a stop member movable into the path of said pin, a frame supporting said one advancing roller, a hand lever operably connected to the frame for moving it to separate the advancing rollers, and means connecting the hand lever with said stop member.

3. In a duplicating apparatus, the combination with a rotatable drum of a gripping member for securing a master sheet thereto, a lever arm on the drum for opening the gripping means, manually movable stop means adjacent to the drum for engaging the lever arm and effecting opening of the gripping member when the drum is rotated in one direction, spring means operable to close the gripping member when the drum is rotated in the other direction to move the lever arm away from the stop means, a cam on the drum to move the stop means out of the path of the lever arm, a platen roller in pressure engagement with the drum, a movable support therefor, and means connecting the stop means to said support to release the platen roller-drum pressure by movement of the stop means into the path of the lever arm.

4. In a duplicating apparatus the combination with a drum of a gripping member for securing a master sheet thereto, a platen roller cooperating with the drum, a pair of copy sheet advancing rollers, a movable frame supporting one of said advancing rollers and the platen roller and means interconnecting the gripping member and said frame, operable, upon opening the gripping member to separate the advancing rollers and move the platen roller away from the drum, said means comprising a lever arm on the drum operable to open the gripping member, a stop member movable into the path of said arm, a hand lever connected to the frame for moving it and means connecting the hand lever with said stop member.

5. In a duplicating apparatus the combination with a drum of a gripping member for securing a master sheet thereto, a platen roller cooperating with the drum, a pair of copy sheet advancing rollers and means interconnecting the gripping member and said platen roller, operable, upon opening the gripping member, to separate the platen roller from the drum, said means comprising a lever arm on the drum operable to open the gripping member, a stop member movable into the path of the lever arm, a frame supporting the platen roller, a hand lever operably connected to the frame for moving it to separate the platen roller from the drum, and means connecting the hand lever with said stop member.

6. In a duplicating apparatus of the character described, the combination with a rotatable drum, of a platen roller in pressure engagement therewith, combined feeding and moistening rollers adjacent to said drum for advancing sheets to the drum for passage between the drum and platen roller, and drive means for the feeding and moistening rollers comprising a wheel connected to the platen roller, a wheel connected to one of the feeding and moistening rollers and means operably connecting the first named wheel to the second named wheel during a portion of each rotation of the drum whereby rotation of the platen roller effects temporary rotation of the feeding and moistening rollers, said connecting means comprising a roller movable into and out of position to engage both of said wheels at the same time, and means actuated by rotation of the drum to move said roller.

7. In a duplicating apparatus, a drum having a gripping member for securing a master sheet thereto, a platen roller cooperating with the drum to press a copy sheet against a master sheet on the drum, a pair of copy sheet advancing rollers, a movable frame supporting one of the advancing rollers and the platen roller for movement together toward and away from the other advancing roller and the drum respectively, manually operable means for moving said frame, a wheel on the platen roller, a wheel on the frame supported advancing roller, an arm pivoted on said movable frame, a roller on said arm adapted to engage both of said wheels, and cooperating means on the drum and arm operable to move said arm to effect engagement and disengagement of the roller thereon with the wheels in timed relation to the rotation of the drum.

8. In a duplicating apparatus, a drum having a gripping member for securing a master sheet thereto, a platen roller cooperating with the drum to press a copy sheet against a master sheet on the drum, a pair of copy sheet advancing rollers, a movable frame supporting one of the advancing rollers and the platen roller for movement together toward and away from the other advancing roller and the drum respectively, manually operable means for moving said frame, a wheel on the platen roller, a wheel on the frame supported advancing roller, an arm pivoted on said movable frame, a roller on said arm adapted to engage both of said wheels, and cooperating means on the drum and arm operable to move said arm to effect engagement and disengagement of the roller thereon with the wheels in timed relation to the rotation of the drum, said manually operable means comprising a lever arm on the drum operable to open the gripping member, a stop member movable into the path of said lever arm, a hand lever connected to the frame for moving it and means connecting the hand lever with said stop member.

HENRY P. KEIL.

REFERENCES CITED

The following references are of record in the file of this patent:

UNITED STATES PATENTS

| Number | Name | Date |
|---|---|---|
| 1,788,782 | Thatcher | Jan. 13, 1931 |
| 2,105,195 | Marchev et al. | Jan. 11, 1938 |
| 2,172,876 | Marchev | Sept. 12, 1939 |
| 2,185,188 | Flanigan | Jan. 2, 1940 |
| 2,231,109 | Breuer et al. | Feb. 11, 1941 |
| 2,266,068 | Peterson et al. | Dec. 16, 1941 |
| 2,299,974 | Grobecker | Oct. 27, 1942 |

FOREIGN PATENTS

| Number | Country | Date |
|---|---|---|
| 580,577 | Great Britain | Sept. 12, 1946 |